H. HOWE.
Wheel-Cultivator.
No. 63,050. Patented Mar 19, 1867.
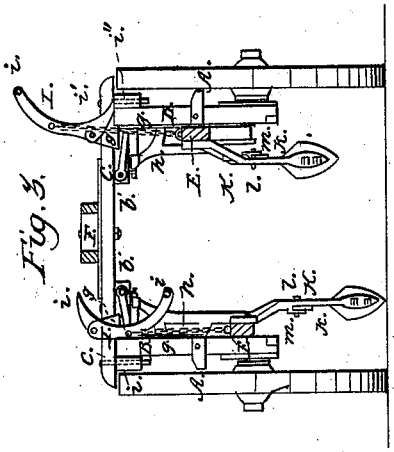
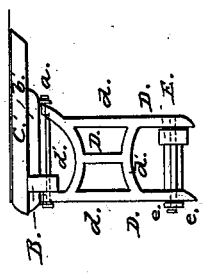
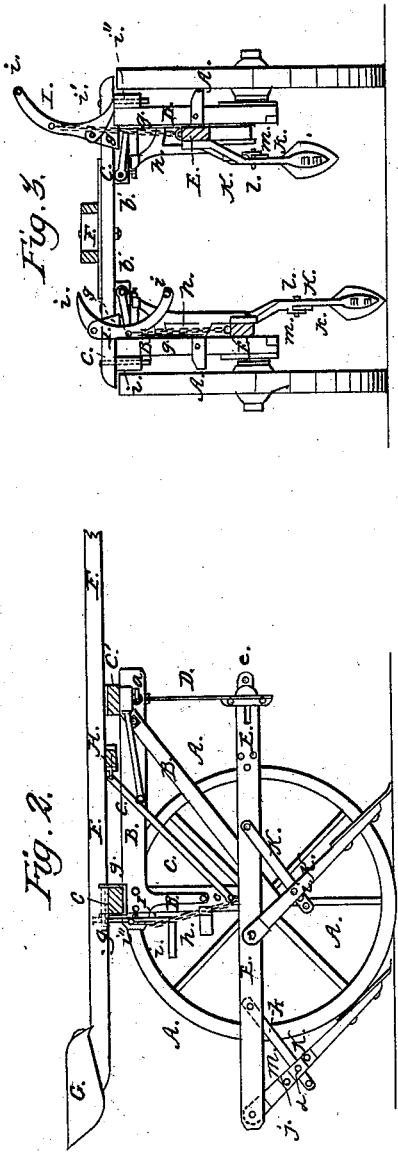
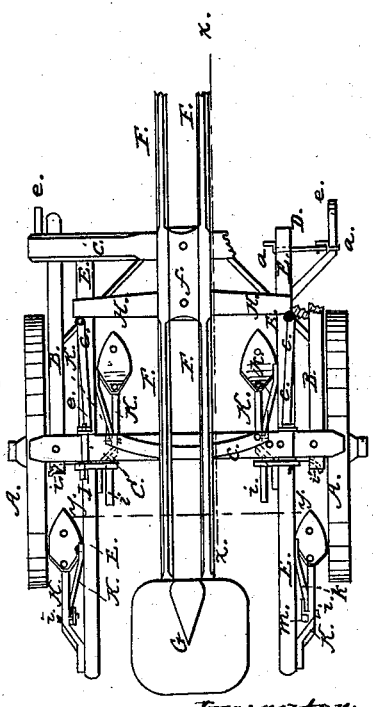
Witnesses:
F. A. Jackson
W. Trewin
Inventor:
H. Howe.

United States Patent Office.

HENRY HOWE, OF ONEONTA, NEW YORK, ASSIGNOR TO HIMSELF AND E. R. FORD, OF THE SAME PLACE.

*Letters Patent No. 63,050, dated March 19, 1867.*

IMPROVEMENT IN CULTIVATORS.

*The Schedule referred to in these Letters Patent and making part of the same.*

TO ALL WHOM IT MAY CONCERN:

Be it known that I, HENRY HOWE, of Oneonta, in the county of Otsego, and State of New York, have invented a new and improved Cultivator; and I do hereby declare that the following is a full, clear, and exact description thereof, which will enable others skilled in the art to make and use the same, reference being had to the accompanying drawings, forming part of this specification, in which—

Figure 1 represents a plan or top view of my invention partly in section.

Figure 2 is a vertical longitudinal section of the same, the plane of section being indicated by the line $x\,x$, fig. 1.

Figure 3 is a vertical cross-section of the same, the plane of section being indicated by the line $y\,y$, fig. 1.

Figure 4 is a detail view to be hereinafter referred to.

Similar letters of reference indicate like parts.

The object of this invention is to so construct a cultivator that it may be very compact and simple, and easily managed and operated.

The invention consists partly in the manner of hanging the plough-beams to the main frame of the machine. Each horse is hitched to a bar, which is on a level with the plough-beams, to the front end of which it is attached. The plough-beam and the aforesaid bar are secured to the frame at the front by a pendant, which allows the beam and its appendages to swing freely in either direction. The centre of each plough-beam is connected by a jointed brace to one end of a cross-bar, which is pivoted to the tongue similar to a double-tree; thereby the two plough-beams are connected with each other and the draught is equally regulated between them. The rear end of the frame is provided with two curved oscillating levers, one above each plough-beam. Each of these levers is connected with the plough-beam which is below it by a chain or cord. By the use of these levers the ploughs can easily be raised and held above the ground. The plough-standards are pivoted to the plough-beams, so that they may be set at any desired angle. They are held in position by means of braces which are secured at one end to the plough-beam, while the other end, which is provided with a series of holes, is passed through a slot or hole in the standard, and is secured to the same by a pin which passes through the standard and through one of the holes in the brace. The tongue, which is pivoted to the front end of the frame, and which extends back behind the frame and supports the driver's seat, is slotted throughout its entire length or any portion thereof, thus allowing the driver to see the centre of the row and guide his team accordingly. The aforesaid pendants and also the bent levers, as well as the wheels on which the machine is supported, are all secured to a part of the frame which can be laterally adjusted, so that the machine may be used for different widths of rows or furrows.

Each of the wheels A is secured to a frame of upright and diagonal braces B. The upright frames B are secured to the horizontal cross-bars C and C' in such a manner that they may be adjusted laterally on the said cross-bars. To the front end of either frame B or to a horizontal bar, $b'$, attached to the said frame, is secured a pendant, D, by means of hinges $a\,a$, in such a manner that the said pendant can swing freely back and forward. Fig. 4 shows a front elevation of one of the pendants D and the manner of attachment. Each pendant consists of two upright bars $d\,d$ which are connected by suitable cross-bars $d'\,d'$. To the front of each plough-beam E is attached a bar, $e$, as seen in fig. 1, in such a manner that the front end of each bar $e$ is parallel with the plough-beam. The horses are attached to the end of these bars $e$. The tongue F is pivoted to the front cross-bar C', and supports, at its rear end, the driver's seat G. It is slotted throughout its entire length, with the exception of the part $f$ where it is pivoted to the frame and connected to the double-tree, (as seen in fig. 1.) The double-tree H, which is pivoted to the under side of the tongue, is connected with each plough-beam E by means of swivel-braces $c\,c$. At either end of the cross-bar C, but directly connected, by means of a metal shoe, $g$, to the upright frame B, is pivoted a lever, I. Each of these levers is connected with one plough-beam by a chain, $h$, as seen more particularly in fig. 3. By raising the handle $i$, on the lever I, the plough-beam will be raised, and it will be held up, as the end $i'$ of the lever rests on a projection, $i''$, of the frame B. In fig. 3 the plough-beam on the right-hand side is represented as being raised. The plough-standards K are pivoted to the plough-beams, as shown, and are held in position and adjusted by means of a perforated brace, $k$, and pin $l$. The brace $k$ passes through a slot in the standard which is formed by a plate or staple, $m$.

Having thus described my invention, what I claim as new, and desire to secure by Letters Patent, is—

1. The pendants D and the manner of securing them to the plough-beams and frame, substantially as and for the purpose herein shown and described.

2. The bars E, in combination with the plough-beams E and pendants D, substantially as and for the purpose herein shown and described.

3. The combination with the tongue F and driver's seat G, of the plough-beams E, swivel-braces $c$, and double-tree H, substantially as and for the purpose herein shown and described.

4. The slotted tongue F, made substantially as and for the purpose herein shown and described.

5. The levers I and chains $h$, for the purpose of raising the ploughs out of the ground and retaining them in that position, substantially as herein shown and described.

6. I claim the upright side-frames B as arranged and connected with the horizontal cross-bars C and C', substantially as and for the purpose herein shown and described.

HENRY HOWE.

Witnesses:
 A. G. SHAW,
 E. R. FORD.